UNITED STATES PATENT OFFICE.

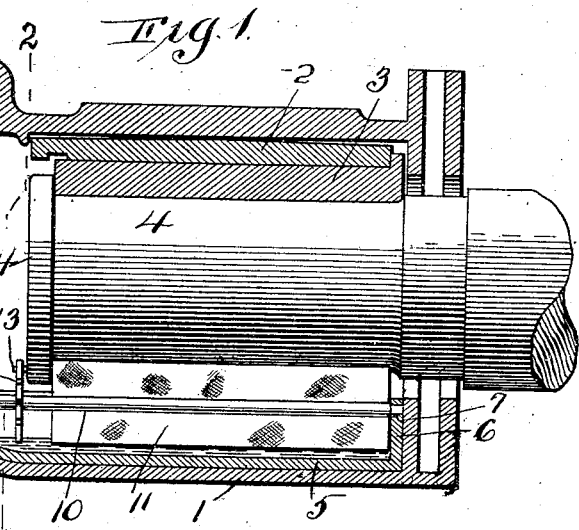

GEORGE W. HEIRD AND GEORGE W. BROWNAWELL, OF PITTSBURG, PENNSYLVANIA.

JOURNAL-BOX.

No. 845,548.          Specification of Letters Patent.          Patented Feb. 26, 1907.

Application filed October 22, 1906. Serial No. 339,951.

*To all whom it may concern:*

Be it known that we, GEORGE W. HEIRD and GEORGE W. BROWNAWELL, citizens of the United States of America, residing at Pittsburg, in the county of Allegheny and State of Pennsylvania, have invented certain new and useful Improvements in Journal-Boxes, of which the following is a specification, reference being had therein to the accompanying drawing.

This invention relates to journal-box lubricators; and its primary object is to provide a journal-box especially designed for use with car-axle journals with means for automatically applying lubricant to the journal in such a manner as to insure an effective and continuous lubrication and an equal distribution of lubricant to all portions of the journal.

A further object of the invention is to provide a journal-box with an automatic lubricator which may be readily removed and renewed when necessary.

A still further object of the invention is to provide an automatic lubricating device adapted for use with car-journal boxes of ordinary construction without altering the form of the box.

The invention comprises a revoluble shaft supported in suitable bearings within a journal-box and carrying a wiper and means for revolving said wiper within an oil-chamber to convey oil to a journal by the revolution of the journal.

The invention also includes certain features of construction which will be fully described hereinafter in connection with the accompanying drawing, which forms a part of this specification, and its novel features will be defined in the appended claim.

In the drawing, Figure 1 is a longitudinal section of a journal-box equipped with our improved automatic lubricator. Fig. 2 is a transverse vertical section on the line 2 2 of Fig. 1. Fig. 3 is a detail perspective view of a portion of the lubricator-shaft with its tappet-wheel and wiper. Fig. 4 is a top plan view of the oil-receptacle within which the lubricator-shaft is supported, and Fig. 5 is a central vertical section of the oil-receptacle.

The reference-numeral 1 designates a journal-box similar in general contour and construction to those now in common use upon railway-cars and provided with the usual wedge 2 and brass 3 for the journal 4. Within the box 1 is arranged an oil-receptacle 5 of concavo-convex form in cross-section and having its inner end wall 6 formed with a bearing-opening 7 and its outer end wall with a bearing 8 to receive the ends of a shaft which preferably consists of two separable sections 9 and 10, each of semicircular form in cross-section. Between the shaft-sections 9 and 10 is secured a wiper 11 of any suitable fabric or material clamped between the sections in such a manner that it will project equally on opposite sides of the shaft. One end of the shaft is extended beyond the outer end of the journal, and upon this extended end is mounted a tappet-wheel 12 in position to be struck by a tappet-pin 13 projecting horizontally from the flange 14 of the journal.

The utility and operation of the improvement will be readily understood. At each revolution of the journal 4 the tappet-pin 13 will strike one of the radial arms of the wheel 12, thus causing the projecting edges of the wiper 11 to alternately dip into the oil in the receptacle 5 and then wipe against the journal, insuring a thorough lubrication of the journal throughout its length.

It is obvious that the operation of the device is entirely automatic and that the supply of oil may be readily renewed without displacing any of the parts of the improvement.

As the invention is adapted for use with ordinary journal-boxes without altering their construction, it will be apparent that such journal-boxes may be equipped with the improved lubricator at small expense.

The construction of the shaft carrying the oil-applying device of sections permits of the ready renewal of the brush or wiper when necessary.

What we claim, and desire to secure by Letters Patent, is—

A car-axle-lubricating attachment comprising in combination with a journal-box, a journal supported therein, and a tappet-pin eccentrically mounted in the end of the journal, a lubricant-receptacle mounted in said journal-box and having a bearing in each end, a two-part shaft journaled in said bearings, a wiper secured between the parts of said shaft and projecting on opposite sides of the shaft, a tappet-wheel mounted on the shaft, the parts of said shaft clamping the wiper and held at one end by the bearing and tappet-wheel, substantially as described.

In testimony whereof we affix our signatures in the presence of two witnesses.

GEORGE W. HEIRD.
GEORGE W. BROWNAWELL.

Witnesses:
MAX H. SROLOVITZ,
F. O. McCLEARY.